US008288885B2

(12) United States Patent
Ganev et al.

(10) Patent No.: US 8,288,885 B2
(45) Date of Patent: Oct. 16, 2012

(54) METHOD AND SYSTEM FOR IMPROVING ELECTRICAL LOAD REGENERATION MANAGEMENT OF AN AIRCRAFT

(75) Inventors: Evgeni Ganev, Torrance, CA (US); Bulent Sarlioglu, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 1170 days.

(21) Appl. No.: 12/132,429

(22) Filed: Jun. 3, 2008

(65) Prior Publication Data
US 2009/0295314 A1    Dec. 3, 2009

(51) Int. Cl.
H02M 7/88 (2006.01)
H02P 3/14 (2006.01)
(52) U.S. Cl. ............................. 307/9.1; 701/3
(58) Field of Classification Search ............ 307/9.1; 701/3
See application file for complete search history.

(56) References Cited

U.S. PATENT DOCUMENTS

| 4,093,900 | A | 6/1978 | Plunkett | |
|---|---|---|---|---|
| 5,493,195 | A * | 2/1996 | Heglund et al. | 318/701 |
| 5,826,673 | A * | 10/1998 | Bates et al. | 180/165 |
| 6,236,580 | B1 | 5/2001 | Aiello et al. | |
| 6,778,414 | B2 * | 8/2004 | Chang et al. | 363/67 |
| 7,012,392 | B2 * | 3/2006 | Nguyen et al. | 318/376 |
| 7,293,621 | B2 * | 11/2007 | Long | 180/165 |
| 7,482,779 | B2 * | 1/2009 | Suzuki | 320/106 |
| 7,550,866 | B2 * | 6/2009 | Breit et al. | 307/9.1 |
| 7,969,038 | B2 * | 6/2011 | Cheng | 307/9.1 |
| 8,028,778 | B2 * | 10/2011 | Luo et al. | 180/65.22 |
| 8,062,169 | B2 * | 11/2011 | Marr et al. | 477/3 |
| 8,164,283 | B2 * | 4/2012 | Sheahan et al. | 318/376 |
| 2002/0157882 | A1 * | 10/2002 | Kubo et al. | 180/65.3 |
| 2002/0158517 | A1 * | 10/2002 | Rouse et al. | 307/151 |
| 2004/0119454 | A1 * | 6/2004 | Chang et al. | 323/284 |
| 2005/0179264 | A1 | 8/2005 | Ganev | |
| 2006/0108867 | A1 * | 5/2006 | Ralea | 303/152 |
| 2007/0209615 | A1 * | 9/2007 | Epshteyn | 123/46 R |
| 2009/0157234 | A1 * | 6/2009 | Breit et al. | 701/3 |
| 2009/0166113 | A1 * | 7/2009 | Luo et al. | 180/65.265 |
| 2009/0302153 | A1 * | 12/2009 | Matasso et al. | 244/99.2 |
| 2010/0066165 | A1 * | 3/2010 | Ganev et al. | 307/9.1 |
| 2010/0141213 | A1 * | 6/2010 | Iida | 320/134 |
| 2010/0148577 | A1 * | 6/2010 | Cheng | 307/9.1 |
| 2010/0185349 | A1 * | 7/2010 | Harada et al. | 701/22 |

FOREIGN PATENT DOCUMENTS

JP 2002369387 12/2002

\* cited by examiner

*Primary Examiner* — Adi Amrany
(74) *Attorney, Agent, or Firm* — Shimokaji & Assoc., PC

(57) ABSTRACT

Regenerated power from actuation loads of an aircraft may be returned to the distribution bus of the aircraft. In the past, actuators were either hydrostatic or pneumatic. With the furtherance of more electric architecture (MEA) aircraft, there has been an increase in electrical actuation modes. The power or current exchange between electrical buses and the electromechanical and electro-hydrostatic flight control actuators is bidirectional, resulting in a need to accommodate regenerative power. Conventional methods may use shunt regulation to dissipate regenerated power. These methods require additional cooling to reject the heat generated. This regenerated power is wasted as dissipated heat. The present invention, on the other hand, may dump the regenerated power back to a power sink, such as into ancillary electrical loads or to the starter/generator as mechanical (kinetic) energy. In the present invention, the energy may not be wasted nor may it generate excessive heat that needs to be dissipated.

8 Claims, 6 Drawing Sheets

METHOD AND SYSTEM FOR IMPROVING ELECTRICAL LOAD REGENERATION MANAGEMENT OF AN AIRCRAFT

BACKGROUND OF THE INVENTION

The present invention generally relates to methods and systems for improving electrical load regeneration of an aircraft and, more particularly, to methods and systems that may return regenerated power to the distribution bus of an aircraft for reuse.

Power electronics for aerospace applications play a significant role in the modern aircraft and spacecraft industry. This is particularly true in the area of more electric architecture (MEA) for aircraft and military ground vehicles. Some aircraft already utilize MEA, including primary and secondary flight control.

Those aircraft that utilize MEA have electrical loads with power demands that are substantially transient in nature. The transients typically last less than a second and have a repetition rate in the range of a fraction of a Hertz. Significant regeneration transients are also anticipated. Large current spikes from the power source are required for vehicle surface control actuators when operating in quadrants I and III (motoring). Large current spikes are regenerated when operating in quadrants II and IV (generating). A schematic of the surface control actuators four-quadrant operation is shown in FIG. 1.

These electrical loads, such as electromechanical and electro-hydrostatic flight control actuators, can demand high peak power, potentially driving the size of an aircraft's electrical power generation and distribution systems. A method of satisfying this peak demand without unduly increasing the size of the electrical system is desirable. The mechanical demand of the actuators results in a high-amplitude, short-duration power or current exchange between the actuator control power electronics and the DC supply bus. This power/current exchange is bidirectional, resulting in a need to accommodate regenerative power.

The typical approach, as shown in FIG. 2, has been to use shunt regulation in an actuator controller 100 to locally dissipate the regenerated power. When the actuator load is aiding (the signs of torque and speed are opposite), the controller must be able to brake the load. This is achieved by removing the energy from the actuator system. In these cases, the electrical machine acts as a generator. The controller provides a variable electric load to control the energy being removed from the mechanical system. The electrical load dissipates the energy as heat. Circuitry and control are provided to detect this condition and direct the power from the motor into an aiding load resistor 102.

This is an inefficient approach because it typically requires cooling (e.g., of load resistor 102) to dissipate the energy. The power is wasted, and the size of the actuator controller is increased to satisfy the necessary cooling requirements. The regenerated power could be stored to specially designed devices, such as batteries, super capacitors, or flywheels. However, substantial penalties will be paid in the areas of reliability, weight, volume and cost due to the substantial increase in complexity.

As can be seen, there is a need for a novel method and system of improved aircraft load regeneration that results in improved performance without requiring shunt regulation and without the necessity for additional cooling.

SUMMARY OF THE INVENTION

In one aspect of the present invention, a power system comprises a prime mover providing power to mechanical power loads; a generator for converting mechanical energy from the prime mover to electrical energy; and an inverter, converter controller (ICC) for converting power between the generator and a power bus, wherein the power bus is a bidirectional bus for delivering power from the ICC to at least one of actuation loads and ancillary loads and for receiving power from the actuation loads when power is regenerated by the actuation loads.

In another aspect of the present invention, an electrical load regeneration management system comprises a bidirectional power bus for delivering power to actuation loads and for receiving regenerated power from the actuation loads; and a power sink for receiving the regenerated power, the power sink being at least one of ancillary electrical loads and mechanical loads.

In a further aspect of the present invention, a method for managing electrical load regeneration in an aircraft comprises providing electrical power to a power bus, the power bus electrically connected to actuation loads and ancillary loads; receiving power regenerated by the actuation loads into the power bus; and delivering the regenerated power to at least one of the ancillary loads as electrical energy and, when the regenerated power is in excess of that needed for the ancillary loads, converting the regenerated power into mechanical energy.

These and other features, aspects and advantages of the present invention will become better understood with reference to the following drawings, description and claims.

DETAILED DESCRIPTION OF THE INVENTION

Figure 1:
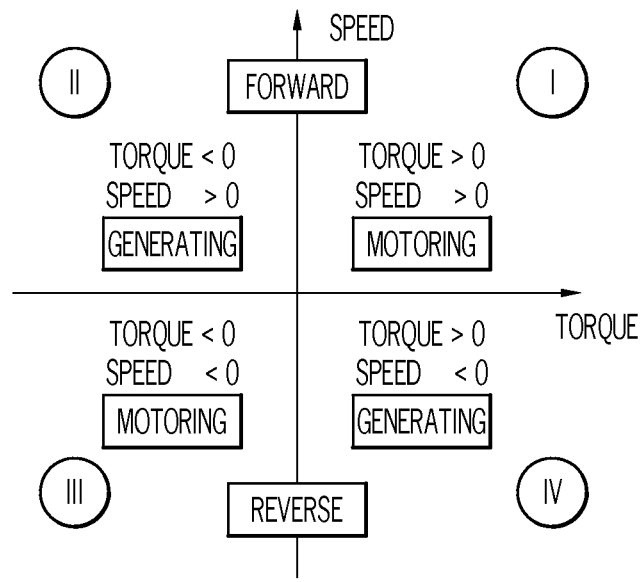
FIG. 1 is a diagram showing four-quadrant operation of surface control actuators according to the prior art.
Figure 2:
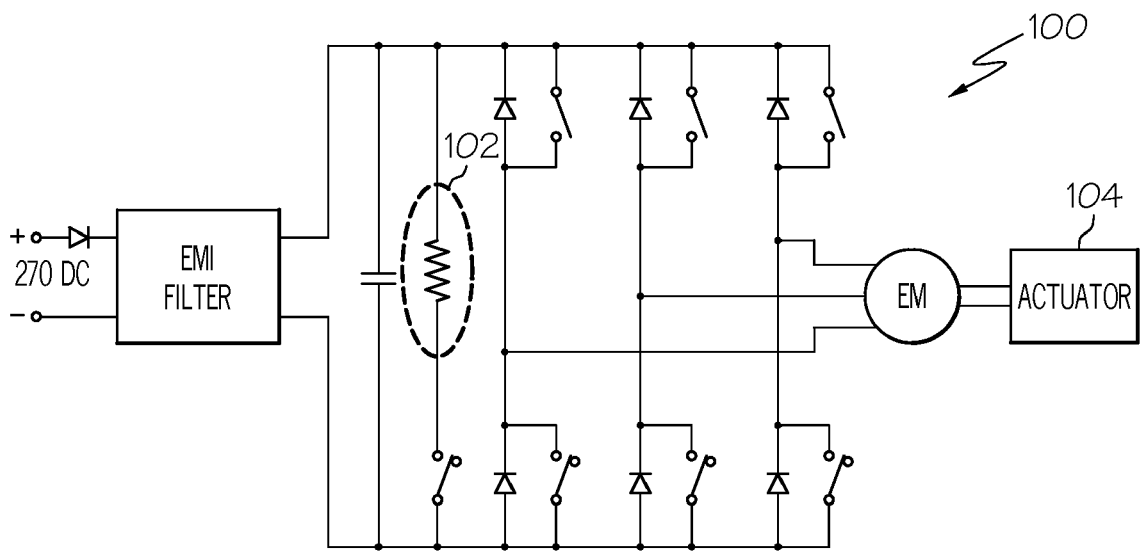
FIG. 2 is a schematic drawing of a power topology for dissipation of regenerated power according to the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides methods and systems for improving electrical load regeneration of an aircraft that may return regenerated power to the distribution bus of the aircraft. In the past, actuators were either hydrostatic or pneumatic. With the furtherance of more electric architecture (MEA) aircraft, there has been an increase in electrical actuation. The power or current exchange between electrical buses and the electromechanical and electro-hydrostatic flight control actuators is bidirectional, resulting in a need to accommodate regenerative power.

Conventional methods may use shunt regulation to dissipate regenerated power. These methods require additional cooling to reject the heat generated. This regenerated power is wasted as dissipated heat. The present invention, on the other hand, may dump the regenerated power back to a power sink, such as into ancillary electrical loads or to the starter/generator as mechanical (kinetic) energy. In the present invention, the energy is not wasted nor does it generate excessive heat that needs to be dissipated.

With the advancement of MEA-based airplanes, there is a need to accommodate regenerative power. One of the sources of regenerative power is electrically driven actuators. These actuators are beginning to replace hydraulic actuators. Hydraulic actuators have certain disadvantages, such as leakage and wear that require high maintenance. Using a breaking resistor in the electrically driven actuators is not desirable due to the size and weight and reliability concerns of handling the long-lasting regeneration power requirements. Therefore, there is a need to develop a solution that accommodates regenerated power of short duration for some applications and of long duration for other applications.

Typically, a 270 volt direct current (Vdc) bus is used to provide power to the electrical loads in high-power DC distribution systems. The 270 Vdc bus is regulated by a power electronics controller. The function of the controller depends upon the machine type. For example, for a permanent magnet (PM) machine, the DC voltage is measured and regulated using a power electronics converter and control topology. For a wound field synchronous machine, the DC link can be regulated using the exciter only, with a generator controller unit (GCU) if passive rectification is used. It is also possible to use both an exciter and an active rectifier to regulate the DC link voltage for wound field synchronous machines.

If a particular load generates more electrical power than the electrical power consumed by other loads in the electrical distribution system, the present invention provides methods and apparatus wherein the remaining power may be consumed by the other electrical loads, motor the prime mover, or both.

The present invention relates to an electrical machine (generator) control mechanism that creates motor power to run the prime mover, i.e., the main engine or an auxiliary power unit (APU), independent of the electrical machine type. The machine can be directly coupled to the engine or interfaced via a gearbox.

Possible scenarios where the present invention may be useful include the following: a) main engine with one wound field synchronous machine; b) main engine with two wound field synchronous machines; c) main engine with more than two wound field synchronous machines; d) main engine with one switched reluctance machine; e) main engine with two switched reluctance machines; f) main engine with more than two switched reluctance machines; g) main engine with one PM machine; h) main engine with two PM machines; and i) main engine with more than two PM machines. In the case of a main engine with more than one electrical machine, all the electrical machines can motor for absorbing regenerated power, one machine generates and (N−1) machine(s) motor, or (N−1) machine(s) generate and one machine motors (wherein N is the total number of electrical machines). In the case of a main engine with one electrical machine, the electrical machine may be configured to a motoring scheme to accommodate the regenerative power. The same scenarios may apply with an APU in the place of the main engine described above.

The present invention for improving aircraft load regeneration may present the following advantages: a) reduced cost due to elimination of shunt regulators, capacitors, flywheels, batteries and diodes; b) simple implementation of software requiring minor changes in the control algorithm; c) improved overall system efficiency because of instantaneous reuse of the regenerated power—no additional power conversion losses are accounted for; d) reduced fuel burn by the engine due to regenerated energy; e) reduced requirements for a cooling system to reject heat in the shunt regulators; f) substantial improvement in cost and reliability expected compared to using dedicated batteries, capacitors, and flywheels; also, removing shunt regulators and diodes contributes to these improvements; g) robust bus voltage regulation to meet stringent power quality requirements; and h) improved energy regeneration capability (limited by ICC size and engine power) compared to limited capability of the shunt regulators.

The present invention may be applicable to both alternating current (AC)-based and DC-based systems.

The present invention may require coordination among the ICC control, the engine control and the electrical distribution bus. For example, the regenerated power typically may be lower than the energy needed by the engine performance for propulsion reasons. Otherwise, some acceleration of the prime mover will be required. Also, engine speed variation can be a concern from the perspective of sizing of the electrical machine for regeneration. This concern may depend on whether the starting of the engine, generation, or motoring due to regeneration of the electrical loads is sizing up the electrical machine power rating.

Motoring Operation of the Actuators (Q1 or Q3)

Figure 3:
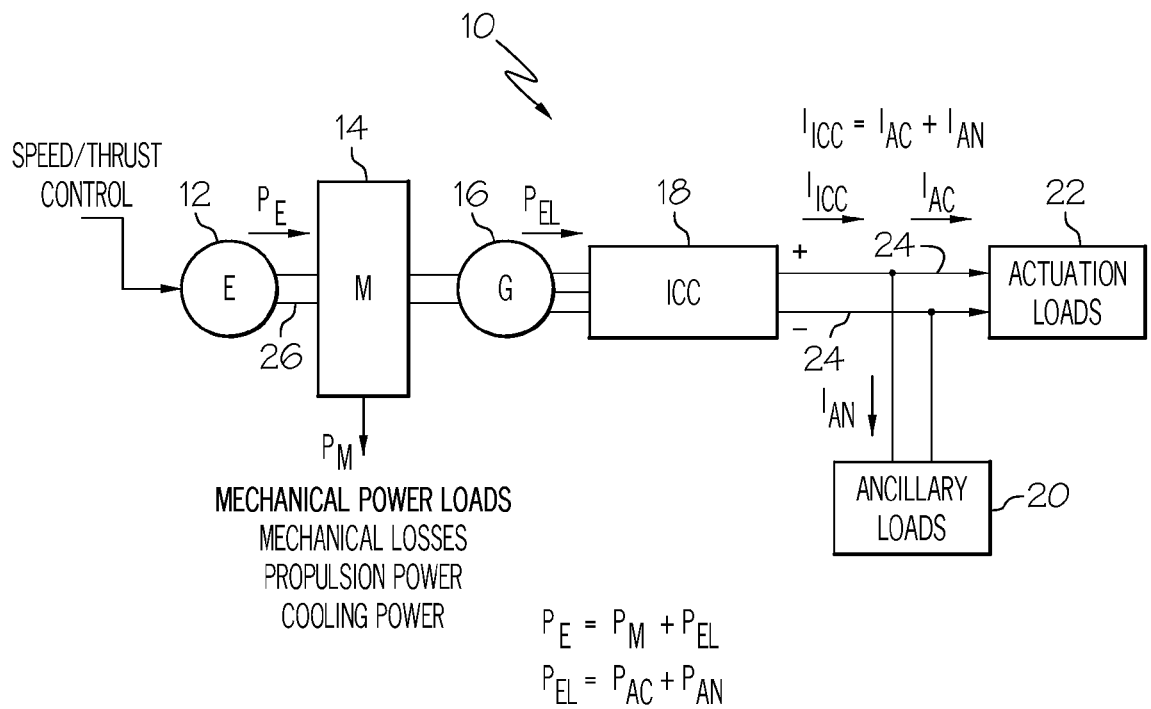
FIG. 3 is a schematic drawing showing motoring operation of actuator loads according to the present invention.

Referring to FIG. 3, there is shown a power system 10 with a prime mover 12, mechanical power loads 14 ($P_M$), an electrical machine or generator 16, an inverter converter controller (ICC) 18, ancillary loads 20, and actuation loads 22. As shown in FIG. 3, it has been assumed that the actuators of the actuation loads 22 are withdrawing power from a distribution bus 24. The electrical machine 16 may either be part of a propulsion system with variable speed or part of an auxiliary power system (APU) where the speed is controlled, typically at a constant speed. The mechanical power loads 14 may include mechanical losses, propulsion power, if any, and cooling power, if any. Additional mechanical loads can be added to a shaft 26 of the prime mover 12.

Actuator loads 22 may operate in Quadrant I or III (see FIG. 1). The direction of power and current flows is shown in FIG. 3. The generator 16 may supply the steady-state and transient power needed by the actuation loads 22 and ancillary loads 20. The ICC 18 may regulate the DC link voltage to meet power quality requirements. The power to the loads 20, 22 may be limited by the rating of the ICC 18 and the rating of the generator 16, as well as by the power available from the prime mover 12. Whether the ICC 18 or prime mover 12 becomes a power limit can be due to environmental conditions, such as altitude. For example, at high altitudes, where air density is reduced, the prime mover 12 cannot provide the same power it provides on the ground. Therefore, the prime mover 12 may become a limitation. It is also possible to overload the ICC 18 for a short time. If engine power is insufficient, this overload of the ICC 18 can be done by using the kinetic energy stored in the inertia of the shaft and reducing the engine speed momentarily within an acceptable limit. In this case, transient power can be provided without the penalty of excessive sizing of the electrical machine 16. Many high-performance generation systems require serious analysis and complex scenarios to optimize the system weight and volume while achieving the desired power output.

With the advent of electrical actuators, the peak power demand can exceed the existing power sizing practices. To provide additional transient capability, batteries or large capacitors (not shown) can be used to supplement the generation capability.

Figure 4:
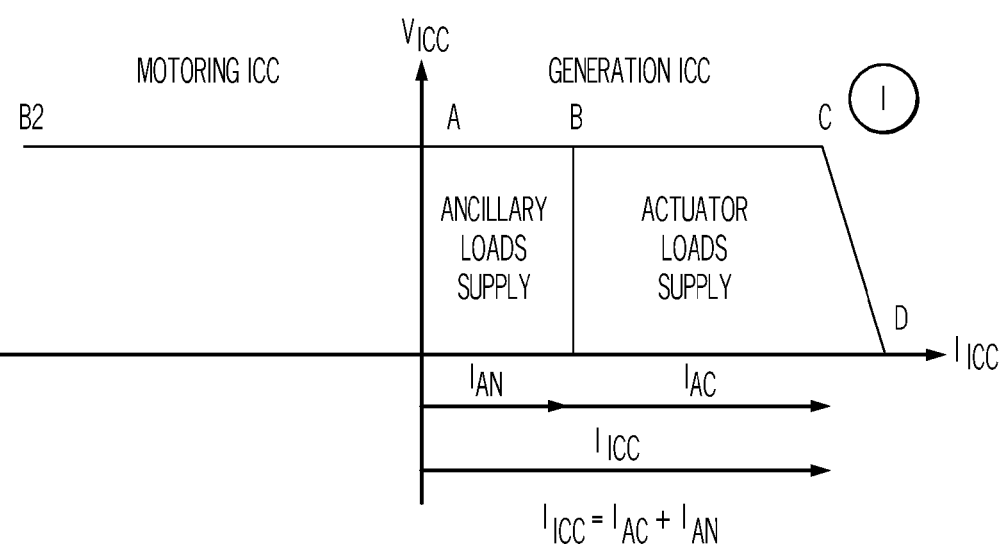
FIG. 4 is a graph showing voltage and current of the inverter, converter controller (ICC) during motoring operation of the actuator loads according to the present invention.

FIG. 4 illustrates the voltage and current output characteristic of the ICC 18. Ancillary loads 20 may create a base power need from the ICC 18. This is characterized in FIG. 4 as voltage regulation from point A to point B. The power for the actuator loads 22 may be very dynamic in nature, and voltage regulation can be achieved from point B to point C as a function of loading. In case the demand for power is increased beyond the capability of the ICC 18, which is shown as point C, the voltage regulation gradually drops from point C to point D to protect the ICC 18 from overloading. Point D is essentially the short circuit condition of the distribution system where the current withdrawn from the ICC 18 is maximized and voltage is essentially zero. The amount of time the ICC 18 should operate at the short condition is usually limited. Typically, the ICC 18 is designed such that it can gracefully survive the short condition and move from point D to point C back to normal operation. FIG. 4 is important from the perspective of sizing the ICC 18 and the electrical machine 16.

The output current of the ICC 18 may be equal to the sum of the ancillary load 20 and the actuator load 22 currents withdraw. The generated electrical power may be distributed between ancillary loads 20, actuation loads 22, and electrical losses primarily located in the ICC 18. The engine-generated mechanical power may be split between the generator 16, where conversion from mechanical to electrical power is performed, and the mechanical power loads 14.

Figure 5:
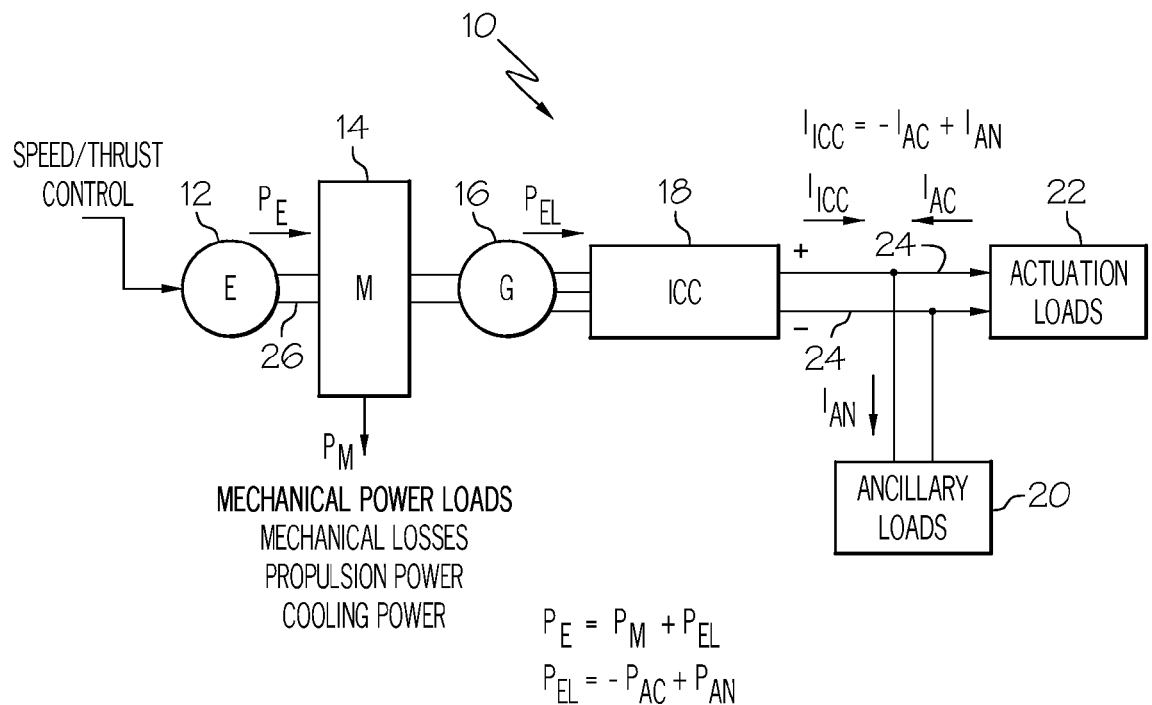
FIG. 5 is a schematic drawing showing regeneration operation of the actuators to ancillary loads according to the present invention.

Regeneration Operation of the Actuators to Ancillary Loads Q2 or Q4 and $I_{AC}<I_{AN}$ FIG. 5 illustrates the same power system shown in FIG. 3, except that in this case the actuation loads 22 are regenerating power to the distribution bus as shown by $I_{AC}$. Because the actuators are regenerating, the actuators operate in Quadrant 2 or 4 of FIG. 1. As a sub-case, it has been assumed that all of the power regenerated by the actuation loads 22 can be consumed by the ancillary loads 20. For this to happen, the power demand of the ancillary loads 20 ($I_{AN}$) should be larger than the power generated by the actuation loads 22 ($I_{AC}$). Any difference between the actuator-regenerated power and the ancillary load power is supplied by the ICC 18. Therefore, the ICC 18 only works in Quadrant 1, providing power to the power distribution bus 24. It should be noted that the bidirectional operation of the distribution bus 24 is required.

In this case, the ICC 18 may be lightly loaded and efficiency of the overall system 10 may be increased, due to the utilization of the actuator regenerated energy. Furthermore, energy may not be wasted in the form of heat via a shunt regulator, and complications due to cooling waste heat energy may be prevented. One could argue that this energy could be stored in a storage element, but, as mentioned above, this technique has its own disadvantages. Another benefit of the present invention is the ability to repeat this mode of operation. This is a significant concern with a shunt regulator, as overheating can occur and the overall system has to be penalized either by oversizing or by shutting down the unit. This may happen when the dissipated energy on the shunt regulator exceeds a certain amount.

The output current of the ICC 18 ($I_{ICC}$) may be equal to the difference between the currents that ancillary loads 20 withdraw and the actuator loads 22 regenerate. It should be noted that since the actuator load current may reverse direction due to regeneration of actuation loads 22, the output current of the ICC 18 may be reduced compared to conventional systems that do not use the regenerated energy. The engine-generated mechanical power may be split between the generator 16, where conversion from mechanical to electrical power is performed, and mechanical power loads 14.

Figure 6:
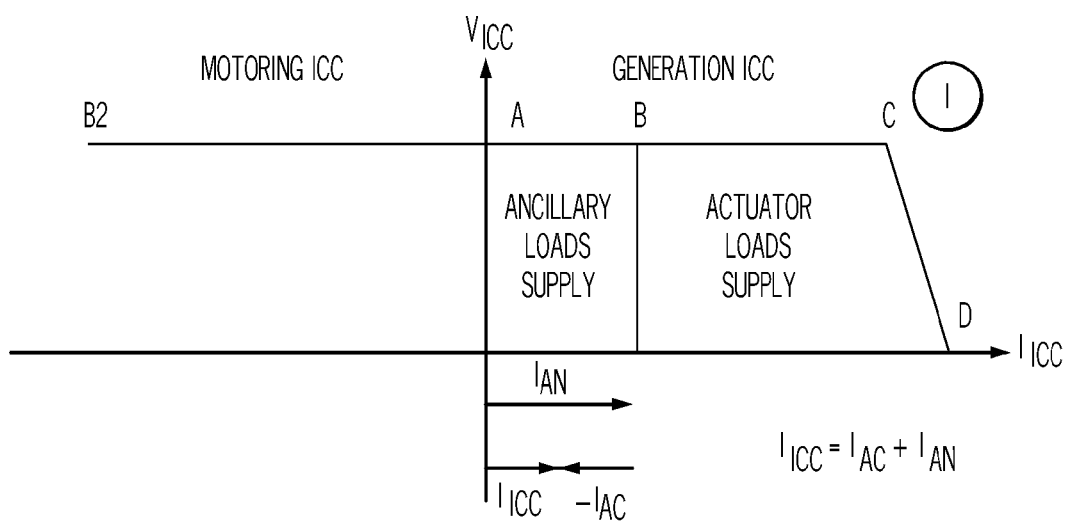
FIG. 6 is a graph showing voltage and current of the ICC during regeneration operation of the actuators to ancillary loads, according to the present invention.

FIG. 6 illustrates the voltage and current output characteristic of the ICC 18. The ancillary loads 20 may create the base power needed from the ICC 18. However, this base power may be reduced by the actuator regenerated power ($P_{AC}$). Therefore, the regulation of the ICC 18 may span from Point A to Point B. Point B is the case wherein the actuation load 22 power is zero, and this can be considered transitioning from motoring to generation of actuator power. Point A is the case wherein all of the ancillary loads 20 are supplied by the actuator-regenerated power.

It should be noted that it is critical that the ICC 18 handle these transitions by regulating the DC link voltage within the limits of power quality specifications such as those specified in MIL-STD-704. The actuators that make up the actuation loads 22 may have very dynamic responses and the bandwidth of the ICC 18 should be tuned to achieve the electrical transients introduced by the actuators.

Regeneration Operation of the Actuators to Power Generation System ($I_{AC}>I_{AN}$ and $P_M>P_{EL}$)

Figure 7:
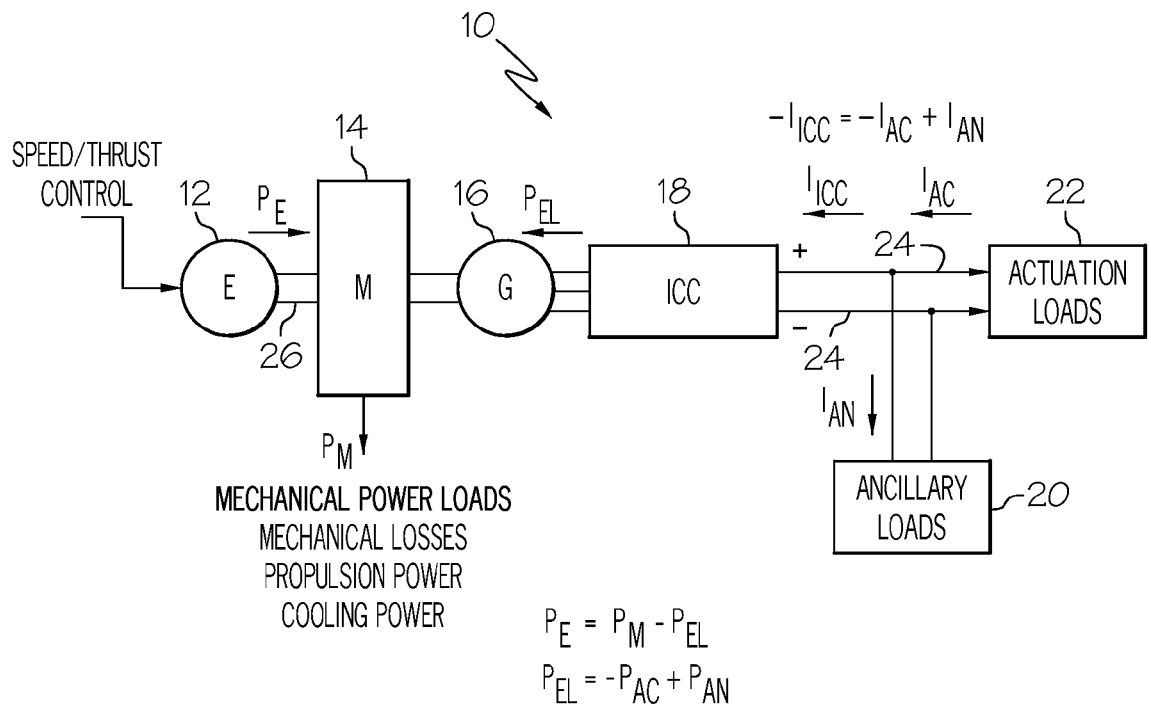
FIG. 7 is a schematic drawing showing regeneration into a starter/generator by the ICC, to drive mechanical loads attached to the prime mover shaft, due to excessive regeneration of actuation loads, according to the present invention.

FIG. 7 illustrates the same power system shown in FIG. 5, except that in this case the actuation loads 22 are regenerating power to the distribution bus 24 and the ICC 18 is motoring the electrical machine 16. Since the actuation loads 22 are regenerating, they operate in Quadrant 2 or 4 of FIG. 1. As a sub-case, it has been assumed that the power regenerated by the actuation loads 22 may be partially consumed by the ancillary loads 20 or by electrical losses located in the ICC 18, and the remaining power is converted by the electrical machine 12 through the ICC 18 into mechanical power for the prime mover 12. In this case, the power demand of the ancillary loads 20 may not be sufficient enough to absorb the power generated by the actuation loads 22. Therefore, the excess power between the actuation load regenerated power and the ancillary load power is directed to the ICC 18. The ICC 18 may work in Quadrant 2 of FIG. 8, and the electrical machine 16 may convert electrical power to mechanical power that assists the prime mover 12.

As in the prior case, it may be that energy is not wasted in the form of heat via shunt regulator, and complications due to cooling of waste heat are prevented. The energy transferred to the mechanical shaft can be utilized in many ways, depending upon the system. For example, this power can be used as propulsion power for the main engine. It is possible to use this energy for driving the mechanical loads 14 or for cooling loads attached to the prime mover 12. In all these instances, the fuel demand is temporarily reduced by the engine controls to allow the excess energy to assist the prime mover 12. In the case of an APU engine, typically, a constant speed is maintained. Reduction of fuel use is expected as well.

The amount of energy converted from the electrical bus 24 to the mechanical shaft 26 may be limited by the rating of the ICC 18 and by the load demand of the mechanical power loads 14. Ideally, the ICC 18 is not expected to be penalized from the perspective of rating for this mode of operation. In other words, the generation mode of operation that provides power to the electrical bus 24 should size the ICC 18. The input current of the ICC 18 ($I_{ICC}$) may be equal to the difference between the actuation current ($I_{AC}$) and the ancillary currents ($I_{AN}$). It should be noted that, in this case, the sum of the currents of the ancillary loads 20 and actuation loads 22 may change sign due to the increased regeneration of the actuation loads 22. The regenerated current of the actuation loads 22 may exceed the current demand of the ancillary loads 20. In this case, the direction of the ICC output current ($I_{ICC}$) changes, and the ICC 18 may convert the DC electrical power from the electrical distribution bus 24 to AC power for motoring the electrical machine 16. The engine-generated mechanical power may be reduced because the regenerated power is converted from electrical to mechanical power by the electrical machine 16. The prime mover 12 may not be accelerated, i.e., $P_M > P_{EL}$. Excess power may be absorbed by the mechanical power loads 14.

Figure 8:
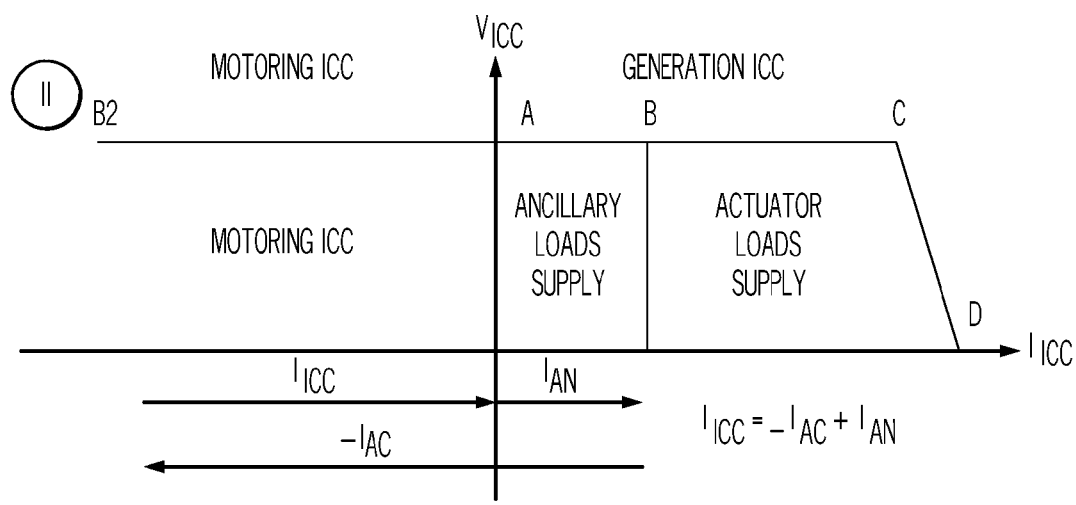
FIG. 8 is a graph showing voltage and current of the ICC during regeneration operation of the actuators to ancillary loads as shown in FIG. 7, according to the present invention.

FIG. 8 illustrates the voltage and current output characteristic of the ICC 18. Ancillary loads 20 may create the base power needed from the ICC 18. This base power may be fully supplied by the regenerated power by the actuation loads 22 and even moves more toward the left of point A. Therefore, the regulation of the ICC 18 may span from Point A and to Point B2. Point A is the case in which actuation load power is equal to the ancillary load power. Point B2 is the case in which the peak power-transfer capability is reached, due to the rating of the ICC 18.

During this operation, the ICC 18 may continue to regulate the DC bus voltage to achieve compliance with power quality specifications, such as those in MIL-STD-704. Alternative voltage regulation may be possible using the actuation controllers (not shown). Also, the transitions from the generating to motoring operations from the perspective of the ICC 18 or the actuation loads 22 should be achieved very smoothly. This can be achieved by implementing the proper control algorithm.

Regeneration Operation of the Actuators to System Inertia or Engine Dynamic Braking ($I_{AC} > I_{AN}$ and $P_M > P_{EL}$)

Figure 9:
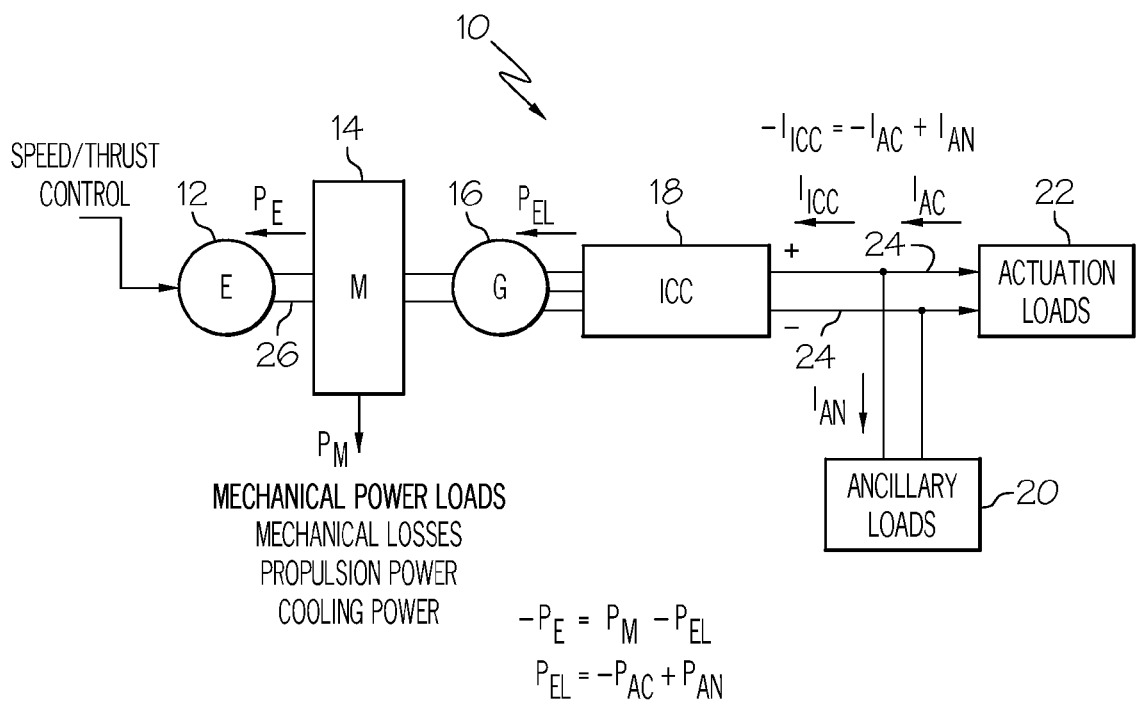
FIG. 9 is a schematic drawing showing regeneration into a starter/generator by the ICC due to excessive regeneration of actuation loads, including the use of an engine brake, according to the present invention.

FIG. 9 illustrates the same power system 10 shown in FIG. 7. Actuation loads 22 may be regenerating and operating in Quadrant 2 or 4 of FIG. 1. The ICC 18 may operate in Quadrant 2 of FIG. 10, transferring DC electrical energy from the electrical bus 24 to AC electrical energy to the electrical machine 16. The electrical machine 16 may convert electrical power to mechanical power, as in the prior case. The difference between the prior case (FIGS. 7 and 8) and this one is the inadequacy of absorbing all of the energy by the mechanical loads 14 at the prime mover 12. Hence, further dynamic braking of the engine is proposed to achieve additional dissipation of the necessary power. This may be needed in applications where the mechanical loads 14 require dynamic demand of power. It should be noted that a speed increase due to dynamic braking is acceptable with this solution.

As in the case described above with reference to FIGS. 7 and 8, the amount of energy converted from the electrical bus 24 to the mechanical shaft 26 may be limited by the rating of the ICC 18 and by the load demand of the prime mover 12. Ideally, the ICC 18 is not expected to be penalized from the rating perspective for this mode of operation. In other words, the generation mode of operation that provides power to the electrical bus 24 should size the ICC 18, not the motoring condition.

The input current of the ICC 18 may be equal to the difference between current ($I_{AC}$) of the actuation loads 22 and the current ($I_{AN}$) of the ancillary loads 20. It should be noted that, in this case, the sum of the currents of the ancillary load 20 and actuation loads 22 changes sign, due to the increased regeneration of the actuation loads 22 exceeding the current demand by ancillary loads 20. In this case, the direction of the ICC output current ($I_{ICC}$) changes, and the ICC 18 may convert the electrical power from the DC electrical distribution bus 24 to AC power for motoring the electrical machine 16. The regenerated power may be converted from electrical to mechanical power by the electrical machine 16, and this power may exceed all the mechanical power loads 14 (e.g., propulsion power, mechanical losses, and cooling power). In this case, the engine may perform the braking mode of operation by converting the excess mechanical energy into thermal energy in the engine of the prime mover 12. If the engine 12 does not have dynamic braking capabilities, short energy spikes can be absorbed at the expense of a small speed increase.

Figure 10:
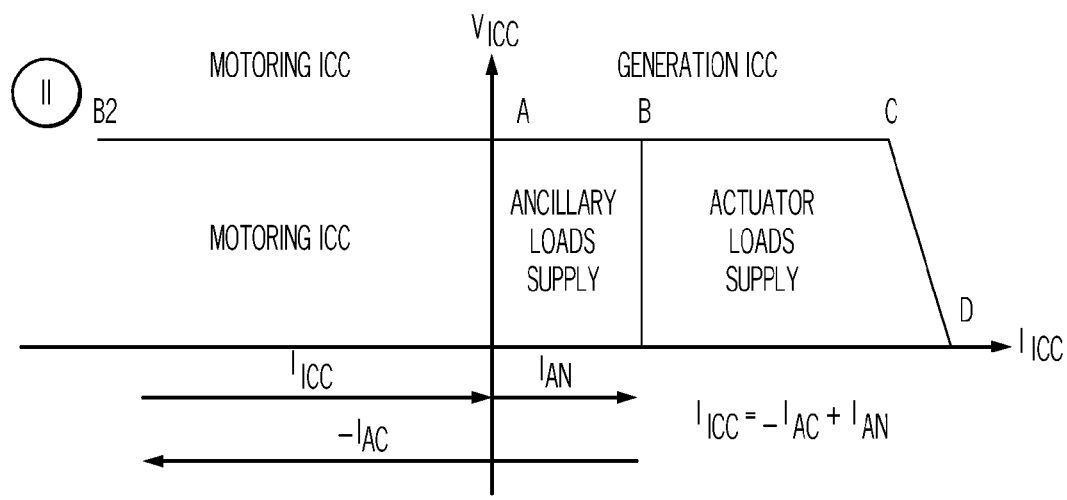
FIG. 10 is a graph showing voltage and current of the ICC during regeneration operation of the actuators to ancillary loads, as shown in FIG. 9, according to the present invention.

FIG. 10 illustrates the voltage and current output characteristic of the ICC 18. Ancillary loads 20 may create the base power needed from the ICC 18. This base power may be fully supplied by the power regenerated by the actuation loads 22 more toward the left of Point A. Therefore, the regulation of the ICC 18 may span from Point A to Point B2. Point A is the case in which the actuation power is equal to the ancillary load power. Point B2 is the case in which the peak power transfer capability is reached due to the rating of the ICC 18.

During this operation, the ICC 18 may continue to regulate the DC bus voltage to achieve compliance with power quality specifications, such as those specified in MIL-STD-704. Alternative voltage regulation may be possible using the actuation controllers. Also, the transitions from the generating to motor operations from the perspective of the ICC 18 should be achieved very smoothly. This can be achieved by implementing the proper control algorithm.

Figure 11:
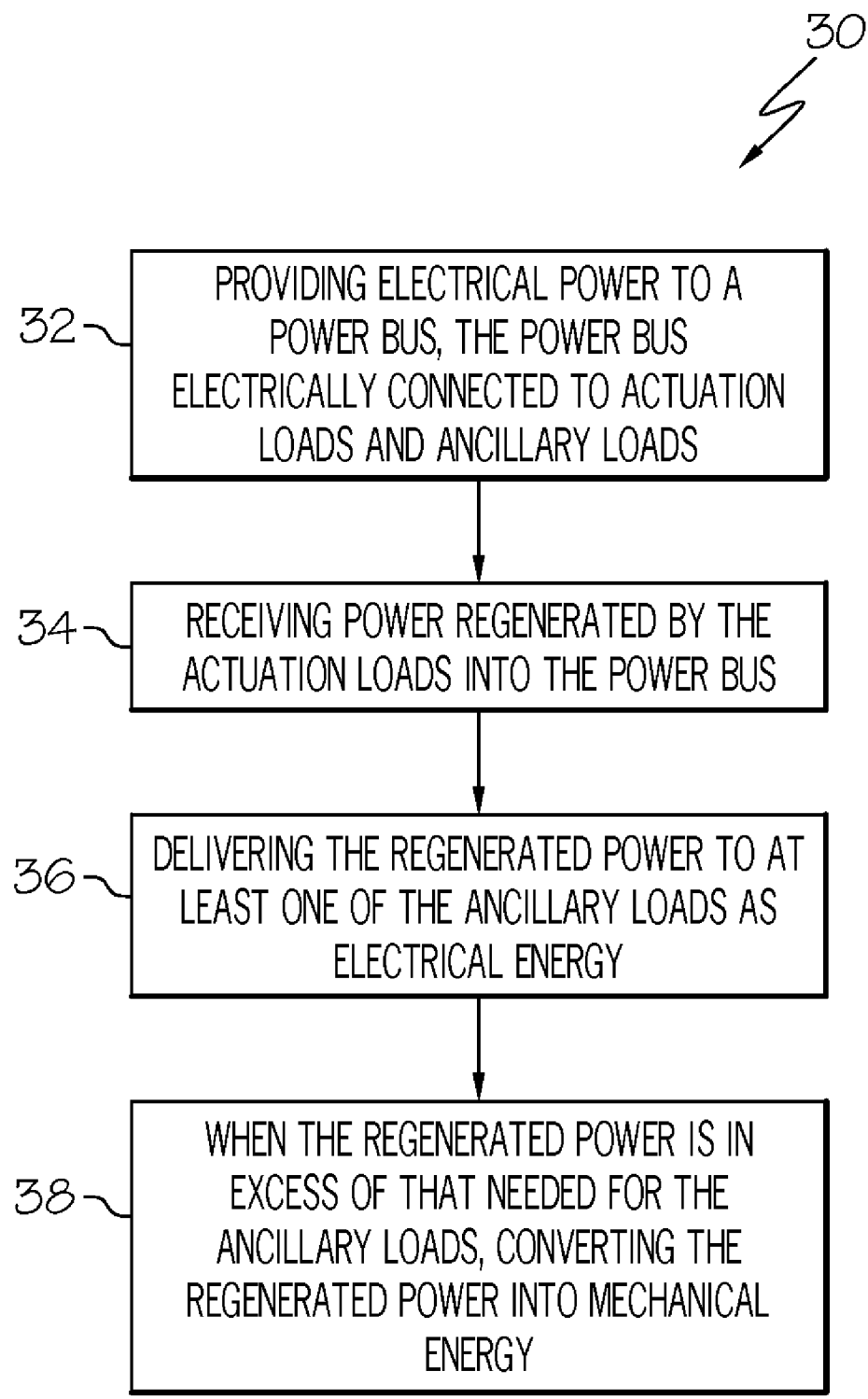
FIG. 11 is a flow chart describing a method according to one aspect of the present invention.

Referring to FIG. 11, a method 30 for managing electrical load regeneration in an aircraft may include a step 32 of providing electrical power to a power bus (e.g., power bus 24), the power bus electrically connected to actuation loads (e.g., actuation loads 22) and ancillary loads (e.g., ancillary loads 20). The method 30 may include a further step 34 of receiving power regenerated by the actuation loads into the power bus. The method 30 may also include a step 36 of delivering the regenerated power to at least one of the ancillary loads as electrical energy and, when the regenerated power is in excess of that needed for the ancillary loads, a step 38 of converting the regenerated power into mechanical energy (e.g., energy to drive the mechanical loads).

It should be understood, of course, that the foregoing relates to exemplary embodiments of the invention and that modifications may be made without departing from the spirit and scope of the invention as set forth in the following claims.

We claim:
1. A power system for an aircraft comprising:
electromechanical control surface actuators adapted to either consume electrical power during operation or regenerate electrical power during operation;
a prime mover providing power to mechanical power loads;

an electrical machine that either converts mechanical energy from the prime mover to electrical energy or converts electrical energy to supply mechanical energy to the prime mover; and a bidirectional inverter converter controller (ICC) that converts power between the electrical machine and a power bus and controls power flow between the power bus and the electric machine, wherein the power bus is a bidirectional bus that delivers power between the ICC and the control surface actuators and between the ICC and ancillary electrical loads of the aircraft, wherein the ICC transmits electrical power from the electrical machine to the bus when power consumption of the control surface actuators and the ancillary loads is positive, wherein the ICC transmits electrical power to the ancillary electrical loads when the control surface actuators regenerate electrical power, and wherein the ICC transmits portions of the electrical power regenerated by the control surface actuators to the electrical machine when the regenerated power exceeds power consumption of the ancillary loads.

2. The power system of claim 1, wherein the power bus is a DC bus.

3. The power system of claim 1, further comprising a dynamic brake for slowing the prime mover when the power regenerated by the actuation loads exceeds the power needed for the ancillary loads.

4. The power system of claim 1, wherein the power system is integrated into an electrical load regeneration management system of an aircraft.

5. An electrical load regeneration management system for an aircraft comprising:

a bidirectional power bus that delivers electrical power to a plurality of control surface actuators and that receives regenerated power from the control surface actuators;

a power sink that receives and consumes the regenerated power as it is being produced without any intermediate transmission to an energy storage device, the power sink including ancillary electrical loads, wherein the ancillary electrical loads draw a constant current; and a bidirectional inverter, converter controller (ICC) that transmits portions of the regenerated power that exceed the ancillary electrical loads to an electric machine the converts the excess regenerated power to mechanical energy in an engine of the aircraft.

6. A method for managing electrical load regeneration in an aircraft, the method comprising:

providing electrical power to a power bus, the power bus electrically connected to ancillary loads and control surface actuators, which actuators are capable of consuming or regenerating electrical power during operation;

receiving power regenerated by the actuators into the power bus; and delivering the regenerated power to at least one of the ancillary loads as electrical energy and, when the regenerated power is in excess of that needed for the ancillary loads, converting the regenerated power into mechanical energy by driving an electric machine connected to a prime mover of the aircraft.

7. The method of claim 6, further comprising slowing the prime mover with a dynamic brake when the regenerated power exceeds the power required for the ancillary loads.

8. The method of claim 6, wherein the regenerated power is consumed as it is being produced without any intermediate transmission to an energy storage device.

* * * * *